(12) United States Patent
Stojanovic

(10) Patent No.: US 8,879,661 B2
(45) Date of Patent: Nov. 4, 2014

(54) SIGNAL PROCESSING APPARATUS, TRANSMITTER, RECEIVER AND METHOD

(75) Inventor: Nebojsa Stojanovic, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 13/404,736

(22) Filed: Feb. 24, 2012

(65) Prior Publication Data

US 2012/0213530 A1    Aug. 23, 2012

Related U.S. Application Data

(63) Continuation of application No. PCT/CN2011/071047, filed on Feb. 17, 2011.

(51) Int. Cl.
*H04L 27/18* (2006.01)
*H04L 25/03* (2006.01)

(52) U.S. Cl.
CPC .................... *H04L 25/03878* (2013.01)
USPC ............... 375/279; 398/194; 398/208

(58) Field of Classification Search
USPC .................... 375/279; 398/194, 208
See application file for complete search history.

(56) References Cited

U.S. PATENT DOCUMENTS

| | | | |
|---|---|---|---|
| 5,307,021 A | 4/1994 | Ishizeki | |
| 7,362,290 B2 | 4/2008 | Aoki | |
| 7,894,728 B1* | 2/2011 | Sun et al. | 398/208 |
| 8,183,951 B2 | 5/2012 | Kato | |
| 8,260,156 B2* | 9/2012 | Qian et al. | 398/209 |
| 8,472,814 B2* | 6/2013 | Zhang et al. | 398/208 |
| 2006/0291554 A1 | 12/2006 | Welles et al. | |
| 2009/0148164 A1* | 6/2009 | Roberts et al. | 398/65 |
| 2010/0054759 A1* | 3/2010 | Oda et al. | 398/202 |
| 2011/0249981 A1* | 10/2011 | Deczky et al. | 398/208 |
| 2012/0057863 A1* | 3/2012 | Winzer et al. | 398/3 |
| 2012/0086492 A1* | 4/2012 | Sun et al. | 327/299 |
| 2012/0185523 A1* | 7/2012 | Hauske | 708/300 |

FOREIGN PATENT DOCUMENTS

| | | |
|---|---|---|
| CN | 1612193 A | 5/2005 |
| CN | 1781312 A | 5/2006 |
| CN | 101421915 A | 4/2009 |

OTHER PUBLICATIONS

Ip, Ezra, "Fiber Impairment Compensation Using Coherent Detection and Digital Signal Processing", Feb. 2010, Journal of Lightwave Technology, vol. 28, p. 502-519.*

International Search Report and Written Opinion of the International Searching Authority issued in corresponding PCT Patent Application No. PCT/CN2011/071047, mailed Nov. 17, 2011.

(Continued)

*Primary Examiner* — Shuwang Liu
*Assistant Examiner* — Sung Ahn
(74) *Attorney, Agent, or Firm* — Brinks Gilson & Lione

(57) ABSTRACT

A signal processing apparatus configured to correct a distortion introduced by a signal processing path into a processed signal comprising a transformer that transforms the processed signal into a transformed signal in frequency domain, a processor that determines a first correction function and a second correction function upon the basis of a transfer function of the signal processing path, a first multiplier that multiplies values of the transformed signal with coefficients of the first correction function to obtain a first corrected signal, a signal reverser that reverses an order of values in a copy of the transformed signal to obtain a reversed transformed signal, a second multiplier that multiplies values of the reversed transformed signal with coefficients of the second correction function to obtain a second corrected signal, and an adder that adds the first corrected signal and the second corrected signal to obtain a corrected output signal.

14 Claims, 2 Drawing Sheets

(56) References Cited

OTHER PUBLICATIONS

Extended European Search Report issued in corresponding European Patent Application No. 11818935.6, mailed Jul. 23, 2012.
Amitay et al., "Linear Equalization Theory in Digital Data Transmission Over Dually Polarized Fading Radio Channels", AT&T Technical Journal. vol. 63, Dec. 1984, printed from The Smithsonian-NASA Astrophysics Data System.
Geyer et al., "Efficient Frequency Domain Chromatic Dispersion Compensation in a Coherent Polmux QPSK-Receiver" OSA/OFC/NFOEC 2010.
Gitlin et al., "Fractionally-Spaced Equalization: An Improved Digital Transversal Equalizer" The Bell System Technical Journal, vol. 60 No. 2, Feb. 1981.
Ip et al., "Digital Equalization of Chromatic Dispersion and Polarization Mode Dispersion" Journal of Lightwave Technology, vol. 25 No. 8, Aug. 2007.
Ip et al., "Fiber Impairment Compensation Using Coherent Detection and Digital Signal Processing" Journal of Lightwave Technology, IEEE 2010.
Pfau et al., "Real-Time Synchronous QPSK Transmission with Standard DFB Lasers and Digital I&Q Receiver" Optical Society of America 2006.
Shannon, "A Mathematical Theory of Communication" The Bell System Technical Journal, vol. 27, Jul. Oct. 1948.
Spinnler, "Equalizer Design and Complexity for Digital Coherent Receivers" IEEE Journal of Selected Topics in Quantum Electronics, vol. 16 No. 5, Sep./Oct. 2010.
Stojanovic et al., "On the Design of AGC Circuits in IM-DD NRZ Optical Transmission Systems" Journal of Lightwave Technology, vol. 26 No. 20, Oct. 15, 2008.
"Data Transmission", Wikipedia Entry http://en.wikipedia.org/wiki/Data_transmission, reprinted Aug. 31, 2012.

\* cited by examiner

SIGNAL PROCESSING APPARATUS, TRANSMITTER, RECEIVER AND METHOD

CROSS-REFERENCE TO RELATED APPLICATION

This application is a continuation of International Application No. PCT/CN2011/071047, filed on Feb. 17, 2011, entitled "SIGNAL PROCESSING APPARATUS, TRANSMITTER, RECEIVER AND METHOD", which is hereby incorporated herein by reference.

TECHNICAL FIELD

The present disclosure relates to the field of digital signal processing and in particular to signal processing for optical receivers.

BACKGROUND

In various data transmission systems, data is transmitted by using an optical signal over an optical path or an optical channel. In a receiver of such a communication system, the optical signal may be transformed to an electrical signal, which may be digitally sampled for further processing.

However, the optical path or optical channel may comprise channel imperfections distorting the received optical signal. A typical distortion is a chromatic dispersion, according to which different wavelengths of the optical signal are transported with different velocities within an optical medium of the optical path or the optical channel, resulting, for example, in broadened pulses of the received optical signal. To compensate for such distortions, the received signal may be accordingly processed to revert the effects of a certain chromatic dispersion of the optical medium.

Furthermore, the optical path may introduce further distortions into the transmitted signal, for example because of transmission properties of the optical path being different for different polarizations or for in-phase and quadrature parts of the transmitted signal. Other possible imperfections may arise from processing portions for processing the transmitted signal as an optical signal or as an electrical signal.

There may be some procedures deployed for correcting one or more of the above imperfections. However, such procedures may be associated with a non-neglectable calculation effort, which may reduce the efficiency of the respective processing portions.

SUMMARY

One of the objects of the present disclosure is to provide an efficient concept for correcting of a distortion introduced by a signal processing path.

This object is achieved by the features of the independent claims. Further embodiments are apparent from the dependent claims.

The present disclosure is based on the finding that distortions of a processed signal may be corrected in frequency domain by two multiplication operations with two respective correction functions and a summation operation of the multiplication results. The correction functions can be derived from a transfer function of the signal processing path, which may be determined in advance. An input set for one of the multiplications may be a re-ordered version of the input set of the other multiplication. Accordingly, the correction of the distortion may be employed with little effort.

According to a first aspect, the present disclosure relates to a signal processing apparatus for the correction of a distortion introduced by a signal processing path into a processed signal. The signal processing apparatus comprises a transformer that transforms the processed signal into a transformed signal in frequency domain, a processor that determines a first correction function and a second correction function upon the basis of a transfer function of the signal processing path reversing an order of values in a copy of the transformed signal to obtain a reversed transformed signal, a second multiplier that multiplies values of the reversed transformed signal with coefficients of the second correction function to obtain a second corrected signal and an adder that adds the first corrected signal and the second corrected signal to obtain a corrected output signal.

For example, the processed signal is a complex signal in time domain, which is transformed into the transformed signal in frequency domain, for example using a fast Fourier transform, FFT, algorithm. Hence, the processed signal may be provided as a time domain signal block, wherein the transformed signal is a frequency domain signal block. Each of the signal blocks may have a length N according to an FFT size. Values of the transformed signal are multiplied with the coefficients of the first correction function, in particular by a one-by-one multiplication, such that the first corrected signal is also a signal block of FFT size N. The reversed transformed signal may also be a signal block, which is generated by re-ordering the values of the transformed signal, in particular by reversing an order of the values. According to some embodiments, the signal reverser may further be configured to determine a complex conjugate version of the copy of the transformed signal. Accordingly, the reversed transformed signal may be a complex conjugate and re-ordered version of the transformed signal.

Similar to the multiplication of the first multiplier, also the multiplication of the second multiplier may be a one-by-one multiplication of the values of the reversed transformed signal with the coefficients of the second correction function.

Accordingly, the corrected output signal of the adder may be a signal block of FFT size N, resulting from a one-by-one addition of the values of the first and the second corrected signal.

According to some embodiments, the signal reverser may be configured to provide the copy of the transformed signal. The transfer function, on which the first and the second correction function depend on, may include an in-phase part and a quadrature part of a complex transfer function. However, the in-phase portion and the quadrature portion may not be applied separately to the processed signal, which may include those in-phase portions and quadrature portions. Hence, the first and the second correction function are derived from the transfer function and applied to the transformed signal and the reversed transformed signal, respectively. This may efficiently correct the distortion introduced by the signal processing path in an efficient way.

According to some embodiments, the signal processing apparatus may further comprise an inverse transformer, in particular an inverse Fourier transformer, that inversely transforms the corrected output signal into an inversely transformed signal in time domain. The inversely transformed signal may be further processed, for example for restoring data transmitted within the processed signal.

According to a first embodiment of the first aspect, the present disclosure relates to a signal processing apparatus, wherein the processor is configured to determine the first correction function and the second correction function iteratively, further using a previously obtained first and second corrected signal. Hence, the first and the second correction function may not only depend on the transfer function, but also on an evaluation of the first and the second corrected signal. For example, a signal power of the first and the second corrected signal may be evaluated.

According to a second embodiment of the first aspect, the present disclosure relates to a signal processing apparatus, wherein the processor is configured to determine the first correction function and the second correction function for correction of a distortion introduced in the processed signal by a distortion transfer function of the signal processing path, wherein the transfer function is a correction transfer function being derived from the distortion transfer function. For example, the distortion transfer function can be determined in advance by using several test signals, for example sinusoidal test signals. The distortion transfer function may be determined for two different polarizations and for an in-phase part and a quadrature part, respectively. Hence, the distortion transfer function may include four separate transfer functions. From the distortion transfer functions, the transfer function of the signal processing path can be derived, for example analytically, e.g. by inverting the distortion transfer function. Hence, the first and the second correction function, which are derived from the transfer function, may be able to correct the distortions introduced by the distortion transfer function.

According to a third embodiment of the first aspect, the present disclosure relates to a signal processing apparatus, wherein the first correction function and the second correction function comprise an in-phase part of the transfer function of the signal processing path and a quadrature part of the transfer function of the signal processing path. For example, the transfer function comprises an in-phase part for the correction of a distortion in an in-phase portion of the processed signal, and a quadrature part for the correction of a distortion in a quadrature portion of the processed signal.

If a correction is to be performed in the frequency domain, it may be desirable to have FFTs of in-phase and quadrature parts separately. However, in-phase and quadrature parts of the processed signal may be mixed in the transformed signal. With Z being the processed signal and with I and Q being in-phase and quadrature parts, respectively, it may be written $$Z = I + jQ$$

$$FFT(Z) = FFT(I) + jFFT(Q) \quad (1)$$

This can, for example, also be written as $$FFT(Z) = Re[FFT(I)] - Im[FFT(Q)] + jIm[FFT(I)] + jRe[FFT(Q)]$$

$$FFT^*(Z) = Re[FFT(I)] - Im[FFT(Q)] - jIm[FFT(I)] - jRe[FFT(Q)]$$

$$FFT_R^*(Z) = Re[FFT(I)] + Im[FFT(Q)] + jIm[FFT(I)] - jRe[FFT(Q)], \quad (2)$$

wherein the sign * denotes a complex conjugate operation and the subscript R denotes a "reverse" operation in frequency domain. According to such a "reverse" operation, if FFT coefficients or values are $$f = (f0, f1, f2, \ldots fN/2, fN/2+1, fN/2+2, \ldots fN-1, fN), \quad (3)$$

then the reversed FFT coefficients or values are $$fR^* = (f0, fN^*, fN-1^*, \ldots fN/2+2^*, fN/2+1^*, fN/2^*, \ldots f2^*, f1^*) \quad (4)$$

In the above and the following equations, bold letters denote complex or real vectors, in particular a vector of N elements, FFT size.

From the above equations, the FFTs of the in-phase and quadrature parts can be deduced to:

$$FFT(I) = \frac{1}{2}[FFT(Z) + FFT_R*(Z)] \quad (5)$$

$$FFT(Q) = -\frac{j}{2}[FFT(Z) - FFT_R*(Z)]$$

Having $$H_C(I) \text{ and } H_C(Q) \quad (6)$$

as correction transfer functions for in-phase part I and quadrature part Q of the signal processing path, equation (5) can be transformed to $$FFT(I)H_C(I) = \frac{1}{2}[FFT(Z) + FFT_R*(Z)]H_C(I) \quad (7)$$

$$FFT(Q)H_C(Q) = -\frac{j}{2}[FFT(Z) - FFT_R*(Z)]H_C(Q),$$

such that $$FFT(I)H_c(I) + jFFT(Q)H_c(Q) = FFT(Z)\frac{1}{2}[H_c(I) + H_c(Q)] + FFT_R*(Z)\frac{1}{2}[H_c(I) - H_c(Q)] \quad (8)$$

With $$C_1 = \frac{1}{2}[H_c(I) + H_c(Q)]$$

$$C_2 = \frac{1}{2}[H_c(I) - H_c(Q)], \quad (9)$$

C1 being a first correction function and C2 being a second correction function, equation (8) can be rewritten as $$FFT(I)H_c(I) + jFFT(Q)H_c(Q) = FFT(Z)C_1 + FFT_R*(Z)C_2 \quad (10)$$

The sum formed by the result of equation (10) may form the corrected output signal.

According to some embodiments, also a chromatic dispersion of the signal processing path, in particular having an optical path, may be compensated. To this end, a chromatic dispersion compensation function may be applied to the processed signal, in particular in the frequency domain. For example, coefficients corresponding to such a chromatic dispersion compensation function CD-1 may be determined in advance on the basis of a certain chromatic dispersion. For example, coefficients CD-1n may be determined according to $$CD_n^{-1}(DL) = \exp\left(-j\left(\frac{2\pi n f_s}{N}\right)^2 \frac{\lambda_0^2 DL}{4\pi c}\right), \quad (11)$$

where λ0 is a signal wavelength, fs is a sampling frequency, N is the FFT size, c is the speed of light, n is the tap number of the N coefficients, L is a fiber length, and D is a dispersion coefficient.

It may then be started with an equation similar to equation (8), namely $$FFT(I)H_c(I)CD^{-1} + jFFT(Q)H_c(Q)CD^{-1} = FFT(Z)\frac{1}{2}[H_c(I) + H_c(Q)]CD^{-1} + FFT_R*(Z)\frac{1}{2}[H_c(I) - H_c(Q)]CD^{-1} \quad (12)$$

Hence, according to a fourth embodiment of the first aspect, the present disclosure relates to a signal processing apparatus, wherein the processor is configured to determine the first correction function C1 and the second correction function C2 for correction upon the basis of the following formula:

$$C_1 = 1/2[H_c(I) + H_c(Q)]CD^{-1}$$

$$C_2 = 1/2[H_c(I) - H_c(Q)]CD^{-1} \quad (13)$$

wherein HC(I) denotes an in-phase part of the transfer function of the signal processing path, wherein HC(Q) denotes a quadrature part of the transfer function, and wherein CD-1 denotes a chromatic dispersion compensation function.

Accordingly, equation (12) may be rewritten as $$FFT(I)H_c(I)CD-1 + jFFT(Q)H_c(Q)CD^{-1} = FFT(Z)C_1 + FFT_R*(Z)C_2 \quad (14)$$

The sum formed by the result of equation (14) may form the corrected output signal.

According to a fifth embodiment of the first aspect, the present disclosure relates to a signal processing apparatus, wherein the processor is configured to determine the first correction function and the second correction function for correction of a distortion introduced by an imbalance between an in-phase processing portion of the signal processing path and a quadrature processing portion of the signal processing path.

The processed signal may be provided by using a 90° optical hybrid, which transforms a received optical signal into an electrical signal. For example, such a 90° optical hybrid may be one of the components to provide phase diversity of an optical coherent receiver. The phase difference of two output signals may be deviated from 90° when the optical hybrid is imperfect. This quadrature imbalance may cause amplitude and phase errors in the output photocurrents. In general, the received signals with photodetectors can be presented as $$I = A_I \cos(\theta) \text{ and } Q = A_Q \cos(\theta + \alpha), \quad (15)$$

where θ represents all phase contributions. AI and AQ are constants. The 90° phase mismatch, which is an offset from 90°, is denoted by α. The constellation diagram of the digitized received signals forms an ellipse in general. It may become a perfect circle if AI=AQ and α=0.

The ellipse may be reshaped into a cycle by $$I' = \frac{1}{a}(I\cos\alpha + Q\sin\alpha) \quad (16)$$

$$Q' = \frac{1}{b}(-I\sin\alpha + Q\cos\alpha),$$

with a and b being diameters of the ellipse, thus providing a gain imbalance between in-phase and quadrature components. However, the distortions introduced by such quadrature imbalances may be compensated.

Hence, according to a sixth embodiment of the first aspect, the present disclosure relates to a signal processing apparatus, wherein the processor is configured to determine the first correction function C1 and the second correction function C2 for correction upon the basis of the following formula:

$$C_1 = \frac{1}{2}\left[(\cos\alpha - j\sin\alpha)\left(\frac{H_c(I)}{a} + \frac{H_c(Q)}{b}\right)\right]CD^{-1} \quad (17)$$

$$C_2 = \frac{1}{2}\left[(\cos\alpha + j\sin\alpha)\left(\frac{H_c(I)}{a} - \frac{H_c(Q)}{b}\right)\right]CD^{-1},$$

wherein HC(I) denotes an in-phase part of the transfer function of the signal processing path, wherein HC(Q) denotes a quadrature part of the transfer function, wherein CD-1 denotes a chromatic dispersion compensation function, wherein a denotes an imbalance angle between an in-phase processing portion of the signal processing path and a quadrature processing portion of the signal processing path, and wherein a and b denote imbalance gains between the in-phase processing portion and the quadrature processing portion.

According to a seventh embodiment of the first aspect, the present disclosure relates to a signal processing apparatus, wherein the processor is configured to determine the first correction function and the second correction function for gain correction. For example, due to aging and temperature variations, there may be gain variations in I and Q branches. Therefore, these quasi-static gain variations may be monitored and corrected.

For example, powers of I and Q branches may be easily estimated, e.g. in software. The calculated powers may then be compared to a reference power PR. Accordingly, gain correction parameters may be derived as:

$$G_I = \sqrt{P_R/P_I}$$

$$G_Q = \sqrt{P_R/P_Q}, \quad (18)$$

where PI and PQ are powers in I and Q branches after transfer functions corrections, respectively.

Hence, according to an eighth embodiment of the first aspect, the present disclosure relates to a signal processing apparatus, wherein the processor is configured to determine the first correction function C1 and the second correction function C2 for correction upon the basis of the following formula:

$$C_1 = \frac{1}{2}\left[(\cos\alpha - j\sin\alpha)\left(\frac{G_I H_c(I)}{a} + \frac{G_Q H_c(Q)}{b}\right)\right]CD^{-1} \quad (19)$$

$$C_2 = \frac{1}{2}\left[(\cos\alpha + j\sin\alpha)\left(\frac{G_I H_c(I)}{a} - \frac{G_Q H_c(Q)}{b}\right)\right]CD^{-1},$$

wherein HC(I) denotes an in-phase part of the transfer function of the signal processing path, wherein HC(Q) denotes a quadrature part of the transfer function, wherein CD-1 denotes a chromatic dispersion compensation function, wherein GI denotes a gain correction parameter for an in-phase processing portion of the signal processing path, wherein GQ denotes a gain correction parameter for a quadrature processing portion of the signal processing path, wherein a denotes an imbalance angle between an in-phase processing portion of the signal processing path and a quadrature processing portion of the signal processing path, and wherein a and b denote imbalance gains between the in-phase processing portion and the quadrature processing portion.

According to a second aspect, the present disclosure relates to a transmitter comprising a signal processing path and a signal processing apparatus according to one of the embodiments of the first aspect. The signal processing apparatus is arranged downstream the signal processing path for the correction of a distortion introduced by the signal processing path into a transmit signal. Hence, the distortions of a transmit signal may be corrected.

According to a third aspect, the present disclosure relates to a receiver comprising a signal processing path and a signal processing apparatus according to one of the embodiments of the first aspect. The signal processing apparatus is arranged downstream the signal processing path for the correction of a distortion introduced by the signal processing path into a receive signal. For example, the receiver may be an optical receiver, wherein the signal processing path may include an optical front end and an optical channel, like a fiber channel.

According to a fourth aspect, the present disclosure relates to a method for a correction of a distortion introduced by a signal processing path into a processed signal. The method comprises transforming the processed signal into a transformed signal in frequency domain, determining a first correction function and a second correction function upon the basis of a transfer function of the signal processing path, multiplying values of the transformed signal with coefficients of the first correction function to obtain a first corrected signal, reversing an order of values in a copy of the transformed signal to obtain a reversed transformed signal, multiplying values of the reversed transformed signal with coefficients of the second correction function to obtain a second corrected signal, and adding the first signal and the second corrected signal to obtain a corrected output signal.

Various embodiments of the second aspect, the third aspect and the fourth aspect arise from the embodiments described in conjunction with the first aspect.

BRIEF DESCRIPTION OF THE DRAWINGS

Further embodiments of the disclosure will be described with reference to the following figures, in which.

DETAILED DESCRIPTION OF THE DRAWINGSEMBODIMENT

Figure 1:
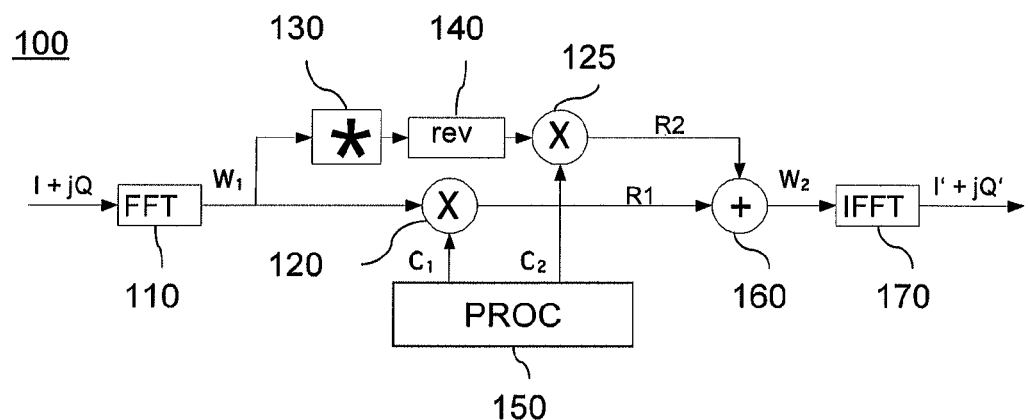
FIG. 1 shows a signal processing according to an embodiment.

FIG. 1 shows an embodiment of a signal processing apparatus 100, that processes the signal of a coherent optical transmission system. The signal processing apparatus 100 comprises a transformer 110, which for example is a fast Fourier transformer. An output of the transformer 110 is coupled to a first and to a second multiplier 120, 125, wherein a signal reverser comprising a complex conjugator 130 and a reverser 140 is connected between the transformer 110 and the second multiplier 125. The first and the second multiplier 120, 125 are provided with a first correction function C1 and a second correction function C2 from a processor 150. The outputs of the first and the second multiplier 120, 125 are connected to an adder 160, whose output is coupled to an inverse transformer 170, which may be implemented with an FFT algorithm.

A processed signal $$Z = I + jQ \qquad (20)$$

is provided to the transformer 110. For example, the signal Z is provided by an optical front end of a coherent optical receiver as a digitally sampled and complex valued signal. A number of samples of the signal set is taken by the transformer 110 as a block and transformed to a transformed signal block W1 of the same length in frequency domain. A copy of the transformed signal block W1 is being complex conjugated by the conjugator 130 and re-ordered by the reverser 140, for example according to equations (3), (4) such that with $$W1 = (W0, W1, W2, \ldots WN/2, WN/2+1, WN/2+2, \ldots, WN-1, WN), \qquad (21)$$

the reversed FFT values at the input of the second multiplier 125 are $$W1,R^* = (W0, WN^*, WN-1^*, \ldots WN/2+2^*, WN/2+1^*, WN/2^*, \ldots, W2^*, W1^*), \qquad (22)$$

wherein the sign * denotes a complex conjugate operation and the subscript R denotes a "reverse" operation in frequency domain. With $$R1 = W1 \cdot C1 \qquad (23)$$

and $$R2 = W1,R^* \cdot C2, \qquad (24)$$

The output W2 of adder 160 results to $$W2 = R1 + R2 = W1 \cdot C1 + W1,R^* \cdot C2 \qquad (25)$$

Hence, having the correction functions C1, C2 derived in frequency domain, a corrected signal may be achieved with 2N complex multiplications and N additions, wherein various distortions may be corrected by using the correction functions C1, C2 in a single procedure. The inversely transformed output signal $$Z' = I' + jQ' \qquad (26)$$

may be used for further processing.

For example, the processor 150 is provided with the correction transfer functions HC(I) and HC(Q) of equation (6). The processor 150 may then determine the first correction function C1 and the second correction function C2 according to equation (9), namely $$C_1 = \tfrac{1}{2}[H_c(I) + H_c(Q)]$$

$$C_2 = \tfrac{1}{2}[H_c(I) - H_c(Q)] \qquad (27)$$

However, the processor 150 may also include a chromatic dispersion compensation into the correction functions C1, C2, resulting in equation (13), namely $$C_1 = \tfrac{1}{2}[H_c(I) + H_c(Q)]CD^{-1}$$

$$C_2 = \tfrac{1}{2}[H_c(I) - H_c(Q)]CD^{-1}, \qquad (28)$$

wherein CD-1 denotes a chromatic dispersion compensation function.

The processed signal may be provided at the input of transformer 110 by using a 90° optical hybrid, which transforms a received optical signal into an electrical signal. For example, such a 90° optical hybrid may be one of the components to provide phase diversity of an optical coherent receiver. The phase difference of two output signals may be deviated from 90° when the optical hybrid is imperfect. This quadrature imbalance may cause amplitude and phase errors in the output photocurrents. A 90° phase mismatch, which is an offset from 90°, may be denoted by $\alpha$.

Figure 2A:
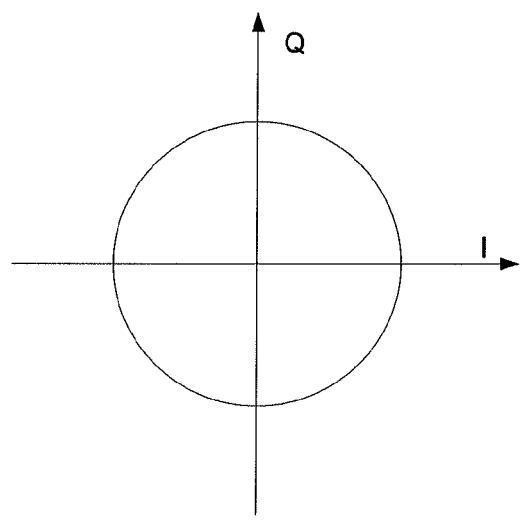
FIG. 2 shows a signal constellation according to an embodiment.
Figure 2B:
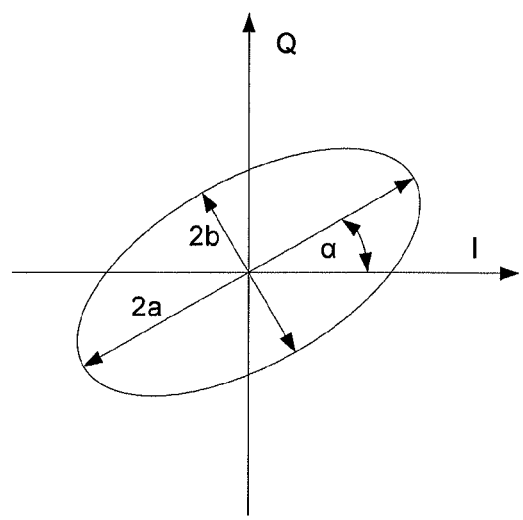

FIG. 2 shows constellation diagrams of possible receive signals, wherein in FIG. 2A no phase mismatch is present, and in FIG. 2B a phase mismatch of a can be seen. Furthermore, in FIG. 2B, the constellation diagram is formed like an ellipse with 2a and 2b being diameters of the ellipse. A compensation for the mismatch can also be included in the correction functions C1, C2, for example according to equation (17) such that $$C_1 = \tfrac{1}{2}\left[(\cos\alpha - j\sin\alpha)\left(\frac{H_c(I)}{a} + \frac{H_c(Q)}{b}\right)\right]CD^{-1} \qquad (29)$$

$$C_2 = \tfrac{1}{2}\left[(\cos\alpha + j\sin\alpha)\left(\frac{H_c(I)}{a} - \frac{H_c(Q)}{b}\right)\right]CD^{-1},$$

wherein $\alpha$ denotes an imbalance angle between an in-phase processing portion of the signal processing path and a quadrature processing portion of the signal processing path, and wherein a and b denote imbalance gains between the in-phase processing portion and the quadrature processing portion.

Figure 3:
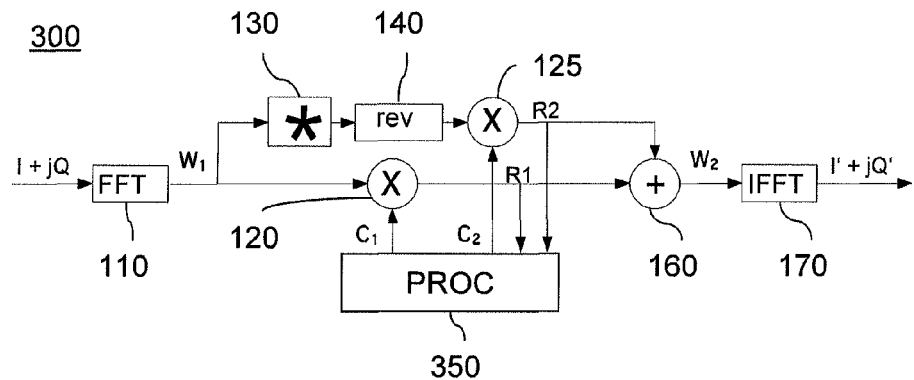
FIG. 3 shows a signal processing apparatus according to an embodiment.

FIG. 3 shows an embodiment of a signal processing apparatus 300, which is mainly based on the signal processing apparatus 100 of FIG. 1. The same reference signs denote the same or similar functions or elements.

The signal processing apparatus 300 comprises a processor 350, which may include the same calculation functions as processor 150. Furthermore, the outputs R1, R2 of the multipliers 120, 125 are provided to the processor 350. Hence, the outputs R1, R2, being corrected signals, may be evaluated by the processor 350 that determines the correction functions C1, C2. For example, due to aging and temperature variations, there may be gain variations in in-phase and quadrature branches. Therefore, these quasi-static gain variations may be monitored and corrected.

For example, powers of in-phase and quadrature branches may be estimated, e.g. in software, which may be run in the processor 350. In particular, the powers may be calculated from the corrected signals R1, R2. For example, a power for the in-phase branch may be calculated from the sum of R1 and R2, and the power of the quadrature branch may be calculated from the difference between the signals R1 and R2.

The calculated powers may then be compared to a reference power PR. Accordingly, gain correction parameters may, according to equation (18) be derived as:

$$G_I = \sqrt{P_R/P_I}$$

$$G_Q = \sqrt{P_R/P_Q}, \quad (30)$$

where PI and PQ are powers in in-phase and quadrature branches after transfer functions corrections, respectively.

Hence, the processor 350 may be configured to determine the first correction function C1 and the second correction function C2 for correction upon the basis of the formula of equation (19), namely:

$$C_1 = \frac{1}{2}\left[(\cos\alpha - j\sin\alpha)\left(\frac{G_I H_c(I)}{a} + \frac{G_Q H_c(Q)}{b}\right)\right]CD^{-1} \quad (31)$$

$$C_2 = \frac{1}{2}\left[(\cos\alpha + j\sin\alpha)\left(\frac{G_I H_c(I)}{a} - \frac{G_Q H_c(Q)}{b}\right)\right]CD^{-1},$$

wherein GI denotes a gain correction parameter for an in-phase processing portion of the signal processing path, and wherein GQ denotes a gain correction parameter for a quadrature processing portion of the signal processing path.

Figure 4:
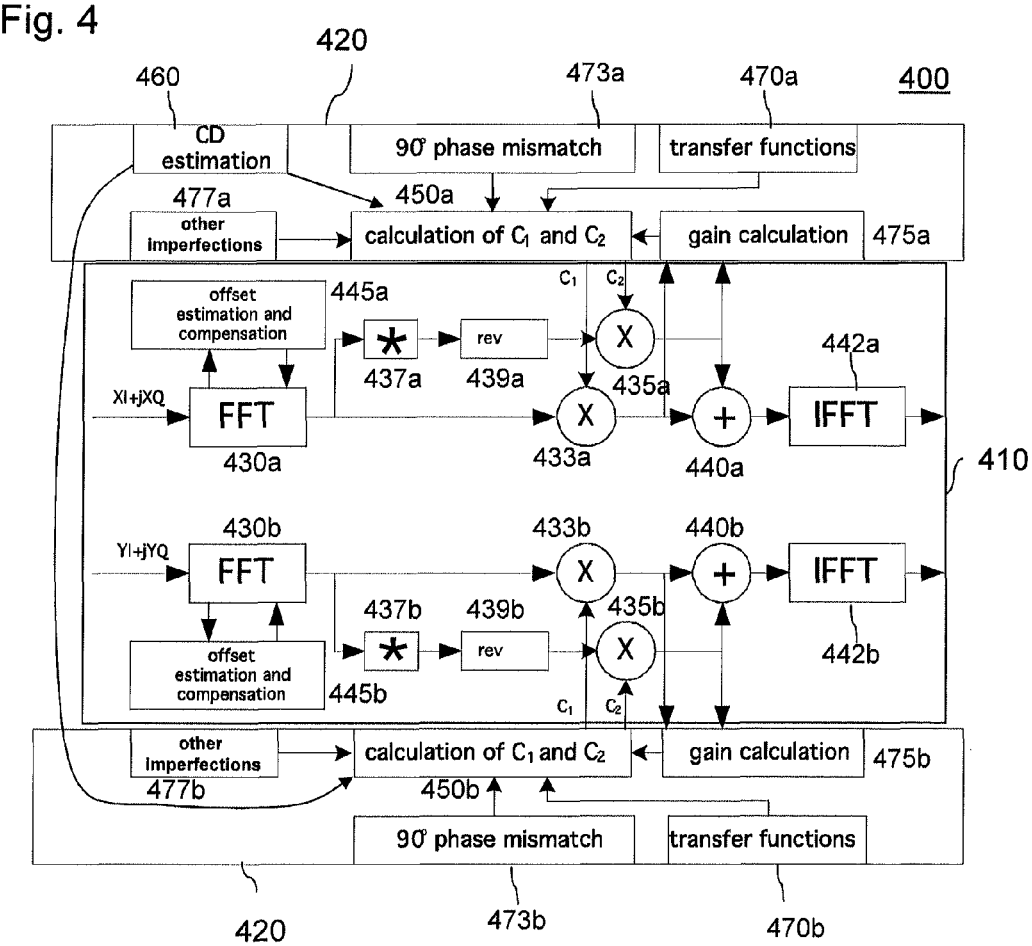
FIG. 4 shows a signal processing apparatus according to an embodiment.

FIG. 4 shows a further embodiment of a signal processing apparatus 400. The signal processing apparatus 400 comprises a first processing block 410 which may be embodied in hardware, and a second processing block 420 which may be embodied in software, for example in a digital signal processor. The second processing block 420 may be similar to the processor 350 of FIG. 3.

The first processing block 410 comprises two processing paths for an X polarization and a Y-polarization. Each of the processing paths comprises a transformer 430a, 430b, which may be similar to the transformer 110. Furthermore, a first multiplier 433a, 433b and a second multiplier 435a, 435b are provided in the processing paths, corresponding to multipliers 120, 125. Outputs of the transformers 430a, 430b are connected to the second multipliers 435a, 435b by conjugators 437a, 437b and reversers 439a, 439b, which may correspond to conjugator 130 and reverser 140, respectively. Outputs of the multipliers 433a, 435a and 433b, 435b are connected to adders 440a, 440b, respectively. Inverse transformers 442a, 442b are connected to the outputs of the adders 440a, 440b, respectively. Each of the paths has an offset estimation and compensation block 445a, 445b, respectively.

The second processing block 420 has respective calculation blocks 450a, 450b for the determination of respective correction functions C1, C2 for each of the processing paths of the first processing block 410. In particular, the first and the second correction function C1, C2 of the upper processing path for the X polarization may be different from the correction functions C1, C2 for the processing path for the Y polarization.

The second processing block further comprises a chromatic dispersion estimation block 460 which may provide a chromatic dispersion compensation function to both calculation blocks 450a, 450b. The second processing block 420 includes a block for providing transfer functions 470a, 470b, respectively, a phase mismatch calculation block 473a, 473b, respectively, a gain calculation block 475a, 475b, respectively, and a calculation block for other imperfections, 477a, 477b, respectively. For example, further imperfections of optical and electrical components in a transmitter and/or a receiver may be taken into account for the calculation of the correction function, according to some embodiments. Additionally, the correction functions may be further modified to optimize a final bit error rate, BER, performance. For example, a gain control may use a feedback from a forward error correction circuit, delivering a bit error rate estimation. A gradient algorithm may be used to optimize the gain and offset.

According to the above-described embodiments, an offset cancellation may be done in frequency domain with negligible complexity. Furthermore, amplitude and phase transfer function corrections may be realized in frequency domain, which reduces the complexity compared to a realization of a correction in time domain.

According to some embodiments, a final gain adjustment may assure that all data paths have the same signal powers.

According to some embodiments, the conjugator and the reverser are not realized by separate calculation blocks, but by hard-wiring in a hardware realization. Hence, no additional complexity is introduced by the conjugators and reversers in this case.

According to some embodiments, an offset estimation and cancellation may be included, in particular in connection with the transformer. For example, an output of the transformer may be filtered for estimating the offset and subtracted from the output before further processing to the transform signal block.

According to some embodiments, the correction function C1, C2 may be calculated in software, which can efficiently be done, because chromatic dispersion and transfer functions are usually slow varying processes. For example, transfer functions are measured only once in a manufacturing phase and loaded to software. A chromatic dispersion compensation function may be estimated periodically.

According to some embodiments, the signal processing apparatus may be used in an optical coherent receiver, in particular downstream to an optical front end.

The invention claimed is:

1. A signal processing apparatus configured to correct a distortion introduced by a signal processing path into a processed signal, the signal processing apparatus comprising:
   a transformer that transforms the processed signal into a transformed signal in frequency domain;
   a processor that determines a first correction function and a second correction function upon the basis of a transfer function of the signal processing path;

a first multiplier that multiplies values of the transformed signal with coefficients of the first correction function to obtain a first corrected signal;

a signal reverser that reverses an order of values in a copy of the transformed signal to obtain a reversed transformed signal;

a second multiplier that multiplies values of the reversed transformed signal with coefficients of the second correction function to obtain a second corrected signal; and an adder that adds the first corrected signal and the second corrected signal to obtain a corrected output signal, wherein the processor is configured to determine the first correction function $C_1$ and the second correction function $C_2$ for correction upon the basis of the following formula:

$$C_1 = \frac{1}{2}[H_c(I) + H_c(Q)]CD^{-1}$$

$$C_2 = \frac{1}{2}[H_c(I) - H_c(Q)]CD^{-1},$$

wherein $H_C(I)$ denotes an in-phase part of the transfer function of the signal processing path, wherein $H_C(Q)$ denotes a quadrature part of the transfer function, and wherein $CD^{-1}$ denotes a chromatic dispersion compensation function.

2. The signal processing apparatus of claim 1, wherein the signal reverser is further configured to provide the copy of the transformed signal.

3. The signal processing apparatus of claim 1, wherein the signal reverser is further configured to determine a complex conjugate version of the copy of the transformed signal.

4. The signal processing apparatus of claim 1, wherein the processor is configured to determine the first correction function and the second correction function iteratively further using a previously obtained first and second corrected signal.

5. The signal processing apparatus of claim 1, wherein the processor is configured to determine the first correction function and the second correction function for correction of a distortion introduced in the processed signal by a distortion transfer function of the signal processing path, wherein the transfer function is a correction transfer function being derived from the distortion transfer function.

6. The signal processing apparatus of claim 1, wherein the first correction function and the second correction function comprise an in-phase part of the transfer function of the signal processing path and a quadrature part of the transfer function of the signal processing path.

7. The signal processing apparatus of claim 1, wherein the processor is configured to determine the first correction function and the second correction function for correction of a distortion introduced by an imbalance between an in-phase processing portion of the signal processing path and a quadrature processing portion of the signal processing path.

8. A signal processing apparatus configured to correct a distortion introduced by a signal processing path into a processed signal, the signal processing apparatus comprising:

a transformer that transforms the processed signal into a transformed signal in frequency domain;

a processor that determines a first correction function and a second correction function upon the basis of a transfer function of the signal processing path;

a first multiplier that multiplies values of the transformed signal with coefficients of the first correction function to obtain a first corrected signal;

a signal reverser that reverses an order of values in a copy of the transformed signal to obtain a reversed transformed signal;

a second multiplier that multiplies values of the reversed transformed signal with coefficients of the second correction function to obtain a second corrected signal; and an adder that adds the first corrected signal and the second corrected signal to obtain a corrected output signal, wherein the processor is configured to determine the first correction function $C_1$ and the second correction function $C_2$ upon the basis of the following formula:

$$C_1 = \frac{1}{2}\left[(\cos\alpha - j\sin\alpha)\left(\frac{H_c(I)}{a} + \frac{H_c(Q)}{b}\right)\right]CD^{-1}$$

$$C_2 = \frac{1}{2}\left[(\cos\alpha + j\sin\alpha)\left(\frac{H_c(I)}{a} - \frac{H_c(Q)}{b}\right)\right]CD^{-1},$$

wherein $H_C(I)$ denotes an in-phase part of the transfer function of the signal processing path, wherein $H_C(Q)$ denotes a quadrature part of the transfer function, wherein $CD^{-1}$ denotes a chromatic dispersion compensation function, wherein a denotes an imbalance angle between an in-phase processing portion of the signal processing path and a quadrature processing portion of the signal processing path, and wherein a and b denote imbalance gains between the in-phase processing portion and the quadrature processing portion.

9. The signal processing apparatus of claim 1, wherein the processor is configured to determine the first correction function and the second correction function for gain correction.

10. A signal processing apparatus configured to correct a distortion introduced by a signal processing path into a processed signal, the signal processing apparatus comprising:

a transformer that transforms the processed signal into a transformed signal in frequency domain;

a processor that determines a first correction function and a second correction function upon the basis of a transfer function of the signal processing path;

a first multiplier that multiplies values of the transformed signal with coefficients of the first correction function to obtain a first corrected signal;

a signal reverser that reverses an order of values in a copy of the transformed signal to obtain a reversed transformed signal;

a second multiplier that multiplies values of the reversed transformed signal with coefficients of the second correction function to obtain a second corrected signal; and an adder that adds the first corrected signal and the second corrected signal to obtain a corrected output signal, wherein the processor is configured to determine the first correction function $C_1$ and the second correction function $C_2$ upon the basis of the following formula:

$$C_1 = \frac{1}{2}\left[(\cos\alpha - j\sin\alpha)\left(\frac{G_I H_c(I)}{a} + \frac{G_Q H_c(Q)}{b}\right)\right]CD^{-1}$$

$$C_2 = \frac{1}{2}\left[(\cos\alpha + j\sin\alpha)\left(\frac{G_I H_c(I)}{a} - \frac{G_Q H_c(Q)}{b}\right)\right]CD^{-1},$$

wherein $H_C(I)$ denotes an in-phase part of the transfer function of the signal processing path, wherein $H_C(Q)$ denotes a quadrature part of the transfer function, wherein $CD^{-1}$ denotes a chromatic dispersion compensation function, wherein $G_I$ denotes a gain correction parameter for an in-phase processing portion of the signal processing path, wherein $G_Q$ denotes a gain correction parameter for a quadrature processing portion of the signal processing path, wherein a denotes an imbalance angle between the in-phase processing portion and the quadrature processing portion, and wherein a and b denote imbalance gains between the in-phase processing portion and the quadrature processing portion.

11. The signal processing apparatus of claim 1, further comprising an inverse Fourier transformer configured to inversely transform the corrected output signal into an inversely transformed signal in time domain.

12. A transmitter comprising a signal processing path and a signal processing apparatus comprising:
   a transformer that transforms the processed signal into a transformed signal in frequency domain;
   a processor that determines a first correction function and a second correction function upon the basis of a transfer function of the signal processing path;
   a first multiplier that multiplies values of the transformed signal with coefficients of the first correction function to obtain a first corrected signal;
   a signal reverser that reverses an order of values in a copy of the transformed signal to obtain a reversed transformed signal;
   a second multiplier that multiplies values of the reversed transformed signal with coefficients of the second correction function to obtain a second corrected signal; and
   an adder that adds the first corrected signal and the second corrected signal to obtain a corrected output signal,
   wherein the signal processing apparatus is arranged downstream the signal processing path and configured to correct a distortion introduced by the signal processing path into a transmit signal,
   wherein the processor is configured to determine the first correction function $C_1$ and the second correction function $C_2$ for correction upon the basis of the following formula:

$$C_1 = \frac{1}{2}[H_c(I) + H_c(Q)]CD^{-1}$$
   $$C_2 = \frac{1}{2}[H_c(I) - H_c(Q)]CD^{-1},$$

wherein $H_C(I)$ denotes an in-phase part of the transfer function of the signal processing path, wherein $H_C(Q)$ denotes a quadrature part of the transfer function, and wherein $CD^{-1}$ denotes a chromatic dispersion compensation function.

13. A receiver comprising a signal processing path and the signal processing apparatus comprising:
   a transformer that transforms the processed signal into a transformed signal in frequency domain;
   a processor that determines a first correction function and a second correction function upon the basis of a transfer function of the signal processing path;
   a first multiplier that multiplies values of the transformed signal with coefficients of the first correction function to obtain a first corrected signal;
   a signal reverser that reverses an order of values in a copy of the transformed signal to obtain a reversed transformed signal;
   a second multiplier that multiplies values of the reversed transformed signal with coefficients of the second correction function to obtain a second corrected signal; and
   an adder that adds the first corrected signal and the second corrected signal to obtain a corrected output signal,
   wherein the signal processing apparatus is arranged downstream the signal processing path and configured to correct a distortion introduced by the signal processing path into a receive signal,
   wherein the processor is configured to determine the first correction function $C_1$ and the second correction function $C_2$ for correction upon the basis of the following formula:

$$C_1 = \frac{1}{2}[H_c(I) + H_c(Q)]CD^{-1}$$
   $$C_2 = \frac{1}{2}[H_c(I) - H_c(Q)]CD^{-1},$$

wherein $H_C(I)$ denotes an in-phase part of the transfer function of the signal processing path, wherein $H_C(Q)$ denotes a quadrature part of the transfer function, and wherein $CD^{-1}$ denotes a chromatic dispersion compensation function.

14. A method for correction of a distortion introduced by a signal processing path into a processed signal, the method comprising:
   transforming, in a processor, the processed signal into a transformed signal in frequency domain;
   determining, in the processor, a first correction function and a second correction function upon the basis of a transfer function of the signal processing path;
   multiplying values of the transformed signal with coefficients of the first correction function to obtain a first corrected signal;
   reversing an order of values in a copy of the transformed signal to obtain a reversed transformed signal;
   multiplying values of the reversed transformed signal with coefficients of the second correction function to obtain a second corrected signal; and
   adding the first corrected signal and the second corrected signal to obtain a corrected output signal,
   wherein the first correction function and the second correction function for correction are determined upon the basis of the following formula:

$$C_1 = \frac{1}{2}[H_c(I) + H_c(Q)]CD^{-1}$$
   $$C_2 = \frac{1}{2}[H_c(I) - H_c(Q)]CD^{-1},$$

wherein $H_C(I)$ denotes an in-phase part of the transfer function of the signal processing path, wherein $H_C(Q)$ denotes a quadrature part of the transfer function, and wherein $CD^{-1}$ denotes a chromatic dispersion compensation function.

* * * * *